United States Patent
Gerich

(10) Patent No.: US 10,035,168 B1
(45) Date of Patent: Jul. 31, 2018

(54) LOW PRESSURE TWO COMPONENT FLUID METERING, MIXING AND DISPENSING SYSTEM

(71) Applicant: Horst Gerich, Minden, NV (US)

(72) Inventor: Horst Gerich, Minden, NV (US)

(*) Notice: Subject to any disclaimer, the term of this patent is extended or adjusted under 35 U.S.C. 154(b) by 0 days.

(21) Appl. No.: 15/297,052

(22) Filed: Oct. 18, 2016

Related U.S. Application Data

(60) Provisional application No. 62/244,670, filed on Oct. 21, 2015.

(51) Int. Cl.
| | |
|---|---|
| *B01F 15/04* | (2006.01) |
| *B01F 3/10* | (2006.01) |
| *B01F 5/06* | (2006.01) |
| *B05C 5/02* | (2006.01) |
| *B05C 11/10* | (2006.01) |
| *B01F 15/02* | (2006.01) |

(52) U.S. Cl.
CPC ............ *B05C 11/1031* (2013.01); *B01F 3/10* (2013.01); *B01F 5/0609* (2013.01); *B01F 15/0237* (2013.01); *B01F 15/0292* (2013.01); *B05C 5/0225* (2013.01); *B01F 2215/006* (2013.01)

(58) Field of Classification Search
CPC ............... B05C 11/1031; B05C 5/0225; B01F 2215/006; B01F 15/0292; B01F 15/0237; B01F 5/0609; B01F 3/10
See application file for complete search history.

(56) References Cited

U.S. PATENT DOCUMENTS

| | | | |
|---|---|---|---|
| 3,097,764 A | | 7/1963 | Loeser |
| 4,304,529 A | * | 12/1981 | Gerich .................... F04B 13/02 417/349 |
| 4,549,676 A | * | 10/1985 | Gerich .................. B29B 7/7438 222/145.6 |
| 4,565,511 A | | 1/1986 | Ramisch |
| 4,628,861 A | | 12/1986 | Mitchell |
| 4,750,941 A | * | 6/1988 | Gerich .................. B01F 15/047 134/22.11 |
| 4,789,100 A | * | 12/1988 | Senf .................... B01F 13/0042 222/134 |
| 5,127,547 A | * | 7/1992 | Gerich ................ B01F 15/0454 222/137 |
| 5,332,125 A | * | 7/1994 | Schmitkons ...... B01F 15/00175 222/1 |

(Continued)

*Primary Examiner* — Frederick C Nicolas

(74) *Attorney, Agent, or Firm* — Womble Bond Dickinson (US) LLP

(57) ABSTRACT

A base valve, a base pump, a catalyst valve, a catalyst pump, a mixing chamber, a base cylinder connected to the base valve, and a catalyst cylinder connected to the catalyst valve. The base and catalyst cylinders are actuated so as to push base and catalyst fluids out of the base and catalyst cylinders, respectively, and into the mixing chamber. An electronic controller has a ready mode and a dispensing mode. In the ready mode, the controller i) activates the base and catalyst pumps and ii) signals the actuator to push or pull, in response to a dispense signal being asserted. In the dispensing mode, the controller a) deactivates the base and catalyst pumps, b) signals the actuator to stop pushing or stop pulling, and maintains a) and b) in response to the dispense signal being de-asserted. Other embodiments are also described.

20 Claims, 4 Drawing Sheets

(56) References Cited

U.S. PATENT DOCUMENTS

| | | | | |
|---|---|---|---|---|
| 6,929,153 B1* | 8/2005 | Gerich | ............... | B01F 5/0077 |
| | | | | 222/135 |
| 7,350,672 B1* | 4/2008 | Gerich | ............... | B05B 7/0408 |
| | | | | 137/607 |
| 2004/0056045 A1* | 3/2004 | Kosmyna | ............ | B05B 7/0408 |
| | | | | 222/95 |

* cited by examiner

LOW PRESSURE TWO COMPONENT FLUID METERING, MIXING AND DISPENSING SYSTEM

This application claims the benefit of the earlier filing date of U.S. Provisional Patent Application No. 62/244,670, filed Oct. 21, 2015.

FIELD

An embodiment of the invention relates to equipment that accurately meters, mixes and dispenses a mixture of at least two reactive fluids (chemical components) being for example a structural adhesive or sealant. Other embodiments are also described.

BACKGROUND

The mixing of two or more fluids for purposes of activating the bonding or sealing properties of the mixture has been well established. This process needs to ensure that the two fluids are accurately metered before being mixed. Typically, for structural adhesives, there is a relatively thick first fluid, which may be referred to as the base material, that is to be mixed with a relatively thin second fluid, which may be referred to as the catalyst. Separate pumps are provided which pump the base material and the catalyst material from larger containers full of such material, into a metering device. The metering may include two, double acting piston cylinder assemblies (e.g., balanced or nondifferential cylinders), one to be filled with the catalyst and another to be filled with the base. These cylinders are designed such that a ratio of their internal volumes containing the catalyst and base are within a range specified for the mixture. The piston inside each of the cylinder assemblies divides the internal volume into front and back portions. The piston moves under pressure of the fluid that is being pumped into one portion, pushing the "metered" amount from the other portion. A four-way valve is also provided for each of the base and catalyst materials, which alternately routes the two portions of each cylinder assembly to a respective input of a mixing chamber. The pumps operate continuously, pumping their respective fluids into the metering cylinder assemblies, while the four-way valves automatically change their positions so that in one half of a cylinder cycle a first portion of each cylinder is being filled with its respective fluid while in the second half of the cycle that filled volume is emptied through the four-way valve (while the second portion is being filled). The output of the mixing chamber serves to dispense the mixture into for example a cartridge that holds the mixture until the mixture is to be applied to the bonding surfaces.

SUMMARY

It has been discovered that for certain types of fluid materials that are to be mixed to produce a structural adhesive, a low pressure metering, mixing and dispensing system is needed so that the average pressure to which one or both of the fluids are subjected by the system is lowered, e.g., to less than 500 psi, and more particularly between 100 psi and 400 psi, while in idle or ready mode. In accordance with an embodiment of the invention, a two-component fluid metering, mixing and dispensing system is described that operates at a lower average pressure (than the convention approach described above in the Background) while repeatedly filling cartridges or during continuous dispensing using a manual or robotic dispensing gun. To help ensure such a lowered average pressure to which the fluids are subjected by the system, the system has an actuator that is coupled to push or pull the rods of a double acting piston cylinder for one of the fluids as well as for the other of the fluids (e.g. a base metering cylinder and a catalyst metering cylinder). This enables the two fluids to be pushed out of their cylinders, respectively, in a controlled manner. In other words, rather than rely solely on the pressure created by the pumps for the two fluid components to move the pistons of the metering cylinders during the first and second phases (fill and empty phases) of each cylinder cycle, the actuator produces much of the forces needed to move the pistons back and forth. An electronic controller signals the actuator to push or pull the rods in such a way as to control the force that is imparted by the actuator upon the rods (and hence the pistons) and also the speed of the pistons, so as to reduce the pressure on the fluids as measured, downstream of their metering cylinders. The controller also serves to electrically activate and deactivate the pumps, which are pushing the two fluids from their respective repositories or containers into their respective metering cylinders. The electronic controller responds to its internal dispense signal, which is asserted, for example, when a cartridge fill button or foot pedal switch is actuated or when a manual dispensing gun trigger is squeezed. Assertion of the dispense signal will cause the controller to signal both of the pumps to activate, and also signal the filling actuator to start pushing or pulling, so that metered fluids begin flowing into the mixing chamber (and out for dispensing). The controller may electrically control a) speed of the base pump, and b) speed or force of pushing and pulling by the actuator, so as to maintain pressure of the base fluid within a dispensing range. The controller then electrically deactivates the pumps and signals the filling actuator to stop pushing or pulling the cylinder rods, but remains in its ready mode, in response to the dispense signal being de-asserted. In this manner, the controller remains in its ready mode when the dispense signal is de-asserted and while the fluid pressures drop, for example upon the cartridge being deemed filled or when the gun trigger has been released. While the system remains "paused" in the ready mode, the pressures on the fluid that remains within the plumbing of the system are dropping, e.g., below 500 psi, and more particularly between 100 psi to 400 psi, until the dispense signal is again asserted. Accordingly, the average pressure to which the fluids in the system are subjected over a relatively long period of time is reduced significantly using such a system, thereby contributing to an improved (e.g., more consistent) mixture that is dispensed after many pauses, over a relatively long period of time such as one hour. This also enables the same system hardware (actuator, cylinder, pumps, valves and plumbing) to be used to meter, mix and dispense both higher viscosity (higher fluid pressure) and lower viscosity (lower fluid pressure) fluid components.

The above summary does not include an exhaustive list of all aspects of the present invention. It is contemplated that the invention includes all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

DETAILED DESCRIPTION

Figure 1:
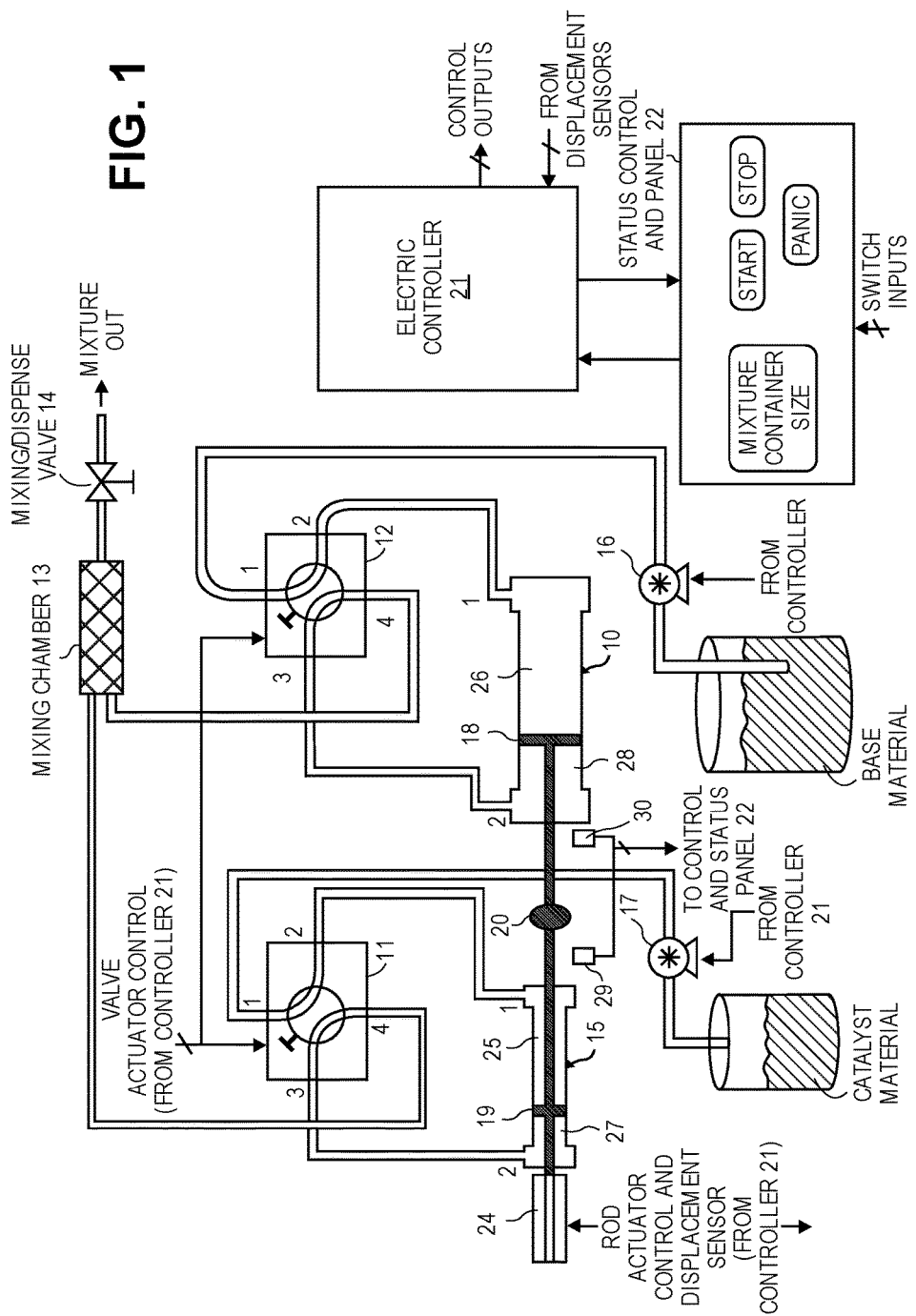
FIG. 1 is a diagram of a two-component fluid metering, mixing and dispensing system in accordance with an embodiment of the invention.

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description. FIG. 1 is a diagram of a two-component fluid metering, mixing and dispensing system in accordance with an embodiment of the invention. The system includes the plumbing needed to draw the base material and the catalyst material (being examples of the two fluids that are to be metered and then mixed) from their respective containers. Note that references to "base" and "catalyst" here should be taken more generally to refer to any two fluids that are going to be reacting with each other to form a desired mixture, such as a structural adhesive or other sealant or bonding chemical. A base pump 16 is to draw and supply the base fluid to port 1 of a base four-way valve 12. Similarly, and contemporaneously, a catalyst pump 17 draws and supplies the catalyst fluid to port 1 of a catalyst four-way valve 11. The base and catalyst pumps 16, 17 may be rotary positive displacement pumps, or other suitable designs.

Figure 2:
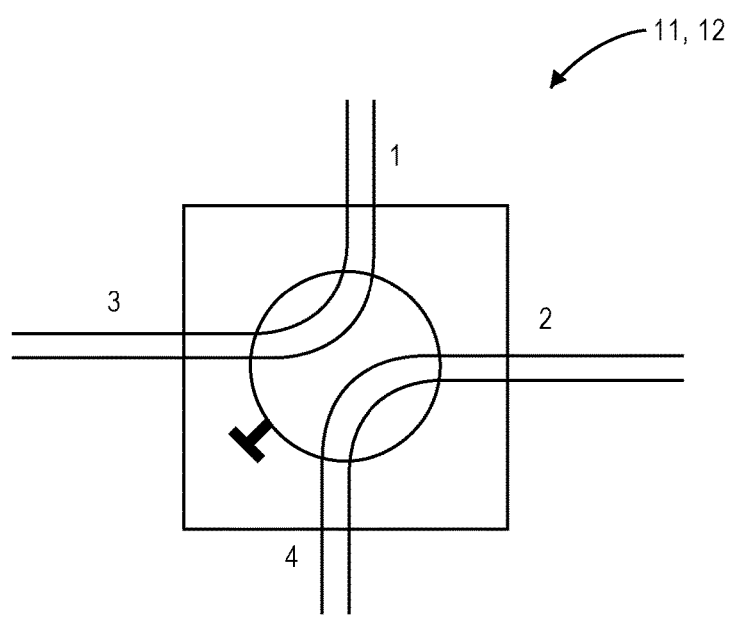
FIG. 2 illustrates an example of the four-way valves used in the system of FIG. 1, in a different state than they are shown in FIG. 1.

FIG. 1 shows the four-way valves 11, 12 in their first state, where ports 1 and 2 are connected together for fluid flow therethrough, while ports 3 and 4 are connected together for fluid flow therethrough (separate from ports 1 and 2 as shown). Each of the valves 11, 12 has a second state depicted in FIG. 2 in which ports 2 and 4 are connected, at the same time as ports 1 and 3 are connected. Although not shown, each of the valves 11, 12 includes an electrically controlled actuator that can be signaled by an electronic controller 21 to configure each valve 11, 12 into the first or second state as desired.

The system also has a mixing chamber 13 having at least two input ports through which metered amounts of the catalyst and base materials are received, from ports 4 of the valves 11, 12, respectively. The mixing chamber 13 may be a passive mixing chamber or it may include active elements that serve to thoroughly mix the base and catalyst materials before delivering a single flow of the mixture through its output port, to an optional mixing/dispense valve 14 as shown. The latter may be fitted with a valve actuator that is electronically controllable. The dispense valve 14 may have at least two positions, namely an open position in which the mixture is dispensed from the output port of the mixing chamber 13, and a closed or stopped position in which the valve is fully closed to ensure that no mixture flows out. The dispense valve 14, and more particularly its actuator, may be electronically controlled by the controller 21, signaling the valve 14 to open in response to an internal dispense signal being asserted (in the controller 21) and close in response to the dispense signal being de-asserted. The valve 14 may be "stationary", e.g., as part of a cartridge filling embodiment, or it may be "mobile", for example built into a portable dispensing gun that can be carried by a human operator or attached to a robot arm.

Metering of the fluids may be achieved with the help of a base cylinder 10 and a catalyst cylinder 15 (also referred to here as metering cylinders 10, 15). Each is a double acting piston cylinder having a rod as shown, where each rod is attached to its respective piston, namely a base piston 18 and a catalyst piston 19. The base piston 18 divides or separates an interior volume of the base cylinder 10 into a back volume 26 that is open to port 2 of the four-way valve 12, and a front volume 28 that is open to the port 3 of the four-way valve 12. Similarly, the piston 19 separates an interior volume of the base cylinder 15 into a back volume 25 that is open to the port 2 of the valve 11, and a front volume 27 that is open to the port 3 of the valve 11. The back volume 26 increases and is filled with the base fluid during a first phase of a cylinder cycle, while the front volume 28 decreases and is emptied of the base fluid therein, by action of the piston 18 moving to the left (as shown in the figure), pushing the base fluid out of the front volume 28. Similarly, for the catalyst cylinder 15, the back volume 25 increases and is filled with the catalyst fluid during the first phase of the cylinder cycle, while the front volume 27 decreases and is emptied of the catalyst fluid therein, by action of the piston 19 moving to the left (as shown in the figure), pushing the catalyst fluid out of the front volume 27. The system as it is depicted in FIG. 1 is in the first phase of the cylinder cycle, where the back volumes 25, 26 are being filled while the pistons 18, 19 move to the left and the front volumes 28, 27 are being emptied, such that metered amounts of the base and catalyst fluids are pushed through ports 2 of the valves 12, 11, respectively, and into the mixing chamber 13.

The pushing of the base and catalyst fluids from the metering devices (which includes the cylinders 10, 15) is achieved using an actuator 24 (also referred to as a filling actuator 24) that is coupled to push or pull the base and catalyst rods (which are attached to their respective pistons 18, 19 as shown). In other words, the delivery of the base and catalyst fluids into the mixing chamber 13 is not controlled by the pressure of the fluids acting on the opposite faces of the pistons 18, 19, where such pressure is produced by action of the pumps 16, 17. Rather, it is by action of the filling actuator 24 applying a force that either pulls or pushes the base and catalyst rods (and hence their attached pistons 18, 19) so as to push the base and catalyst fluids into the mixing chamber 13, through the connected ports 4 and 3 of each of the valves 11, 12.

In the particular example of FIG. 1, the base and catalyst rods extend out of their respective cylinders 10, 15 and are rigidly joined to each other by a coupler 20 so that the base and catalyst rods move as one cylinder rod, back and forth during the cylinder cycle. In this example, the filling actuator 24 is directly attached to the catalyst rod, and pushing or pulling the catalyst rod causes commensurate movement of the base rod by virtue of the coupler 20 rigidly coupling the two rods. Other configurations for synchronizing the movement of the pistons 18, 19 are possible.

The actuator 24 may be a linear actuator (e.g., pneumatically or electro-mechanically powered) and may include a displacement sensor whose output may effectively indicate the location of the cylinder rod, so that once the cylinder rod has reached a position that represents the end of the first phase of a cylinder cycle, the actuator 24 may be signaled to reverse direction (in this case push the cylinder rod to the right) and begin the second phase of the cylinder cycle. The displacement sensor in the actuator 24 may also indicate when the cylinder rod reaches a position that represents the end of the second phase of the cylinder cycle.

It should be appreciated that during the second phase of the cylinder cycle, the back volumes 25, 26 decrease due to the pistons 19, 18 moving to the right, which causes the metering devices to be emptied of their respective fluids through ports 2 and 4 of their respective valves 11, 12. This occurs because the latter have been changed into the state depicted in FIG. 2, at the start of the second phase. In other words, at the end of the first phase of the cylinder cycle, or in response to the cylinder rod reaching a first position as detected using for example a displacement sensor within the actuator 24, the four-way valves 11, 12 are signaled to transition from the state depicted in FIG. 1 into the state depicted in FIG. 2 in which ports 1 and 3 are connected to each other while ports 2 and 4 are connected to each other. This means that the fluid that is within the back volumes 25, 26 can now be pushed out into the mixing chamber 13, through ports 2 and 4. In the meantime, pumps 16, 17 may continue to remain activated during the second phase so as to fill the front volumes 27, 28.

As described below, an electronic controller 21 is provided that may electronically adjust pressure or flow rate at the outlet of the mixing chamber 13 to a desired level, by electronically adjusting outlet flow from the pumps 16, 17 (e.g., the speeds of rotary displacement pumps) and by setting the force or speed of the actuator 24. The controller 21 may be implemented as a programmed microprocessor having the functionality described below and especially in connection with the flow diagram of FIG. 4, together with any interface circuitry needed to electrically communicate with the valve actuators of the 4-way valves 11, 12, the electrically controlled pumps 16, 17, the actuator 24, and the displacement sensor for the cylinder rod (e.g., as part of the actuator 24).

As suggested above, the base material may contain beads that can be crushed if the pressure on the base material (within the as shown plumbing of the system) is sustained for too long, above a certain threshold, resulting in the mixture being less effective for its intended purposes, e.g., sealing or bonding. In accordance with an embodiment of the invention the controller 21 is configured to maintain a lower average pressure on the base material within the plumbing of the system, over a relatively long period of time during which the system transitions several times between a dispensing mode of operation in which the mixture is flowing out of mixing chamber 13, by causing the pressures to drop to less than 500 psi, and more particularly between 100 psi and 400 psi, during "ready mode" time intervals in which the mixture flow has been stopped and the pressures on the base material in the plumbing of the system are dropping, rather than staying as high as they were during the dispensing mode.

Referring to FIG. 1, the controller 21 may have an internal, dispense signal, which may be a logic control signal or programmed variable that can be either asserted or de-asserted. While the controller 21 is in its ready mode, the dispense signal may become asserted due to a) a start switch that is on a status and control panel 22 being actuated by an operator or user of the system, b) a foot pedal switch being pressed by the user, c) a manual dispensing gun trigger being squeezed, or d) another event indicating the start of a cartridge filling cycle or simply the start of continuous dispensing. In the case where a manual (human operated) gun is to be used for dispensing, there may be a signal wire or other communication link that couples a trigger sensor on the gun back to the electronic controller 21, to provide an input for generating the dispense signal. When the dispense signal is asserted, or in response thereto, the controller 21 transitions to dispensing mode by signaling the actuator 24 to move and the pumps 17, 16 to operate and controlling the valves 11, 12 as described above (and also described further below) which causes pressures on the fluids in the plumbing of the system to increase to "dispense levels" and the fluid components to be metered, mixed and dispensed from the output of the mixing chamber 13.

The dispense signal may be de-asserted by a) the stop switch on the status and control panel 22, b) by the foot pedal switch being released, c) by the hand held gun trigger being released, or d) another event indicating the end of the cartridge filing cycle (e.g., a cartridge filling timer expiring). or simply that continuous dispensing is to be stopped. In response to the dispense signal being de-asserted, the controller 21 returns to its ready mode, causing the fluid pressures to drop due to the pumps 16, 17 becoming inactive and the actuator 24 being stopped. The controller 21 will however respond at any time during ready mode to a subsequent assertion of the dispense signal, by a) electrically activating the base and catalyst pumps 16, 17 again, and b) signaling the actuator 24 to push or pull the cylinder rods, which raises the fluid pressures back up to dispensing levels.

The controller 21 is to electronically set pressure or flow rate at a) the outlet of the mixing chamber 13, or b) just downstream of the valve 14 (if fitted with the valve 14), by signaling the actuator 24 to adjust its speed at which it pushes or pulls the cylinder rod. The controller 21 can also electronically set the outlet pressure at one or both of the pumps 16, 17. All of these may be done during dispending mode. Note that different fluids may call for different dispensing pressure levels on the fluid, during dispensing. For example, this may depend on the fragility of the beads in the base material. The controller may be programmed to control the actuator 24 and the pumps 16, 17 during dispensing, based on knowledge of the highest pressure to which the particular base material being used in the system can be subjected. As pointed out earlier, the pressure of a fluid may be measured at an outlet of the base pump 16 or the catalyst pump 17, or it may be measured as a "back pressure" at the exit of one of the metering cylinders 10, 15. These are convenient locations where a pressure gauge may be fitted.

While mixture is flowing out of the mixing chamber 13 (dispensing mode), the back pressure may rise to within a dispensing range 200 psi-3500 psi. This is referred to as the dispensing pressure range (pressure levels). The back pressure then drops when fluid flow in the system is paused, due to the dispense signal being de-asserted, e.g., the controller 21 is in its ready mode and no mixture is flowing out of the mixing chamber 13 because the pistons of the metering cylinders 15, 10 have been stopped, the pumps 16, 17 are inactive, and the mixing/dispensing valve 14 has closed.

When mixture is flowing out of the mixing chamber 13 during dispensing mode (because the mixing/dispensing valve 14 is open), the outlet pressure at the base pump 17 may rise to within the dispensing range 200 psi-3500 psi. This is referred to as the pump outlet pressure range during dispensing. The pump outlet pressure then drops when the system is paused (due to the dispense signal being de-asserted), e.g., the controller 21 is in its ready mode, and no mixture is flowing out of the mixing chamber 13 because the pumps 16, 17 are inactive, the pistons of the metering cylinders 15, 10 have stopped, and the valve 14 has closed.

Referring back to FIG. 1, this figure depicts another embodiment of the invention in which a mechanism is provided for an emergency shut down of the system. When the position of the cylinder rod exceeds one end of its operating range, a first over-limit sensor or switch 29 is set off (or tripped), e.g., by the coupler 20 or by any other part of the rod. The cylinder rod sets off or trips a second over-limit switch 30, when its position exceeds another end of its range. The sensors or switches 29, 30 may be electrically coupled to the controller 21 to signal that an emergency stop situation has arisen, due the cylinder rod having moved out of its operating range. In response to such a signal being asserted, the controller 21 may not go into its ready mode but rather may in that case shut itself down, until a power on reset or calibration or self-test routine is performed to ensure that the cylinder rod and in particular the metering device of which it is a part, are working properly (before allowing the controller 21 to go back into ready mode).

Figure 3B:
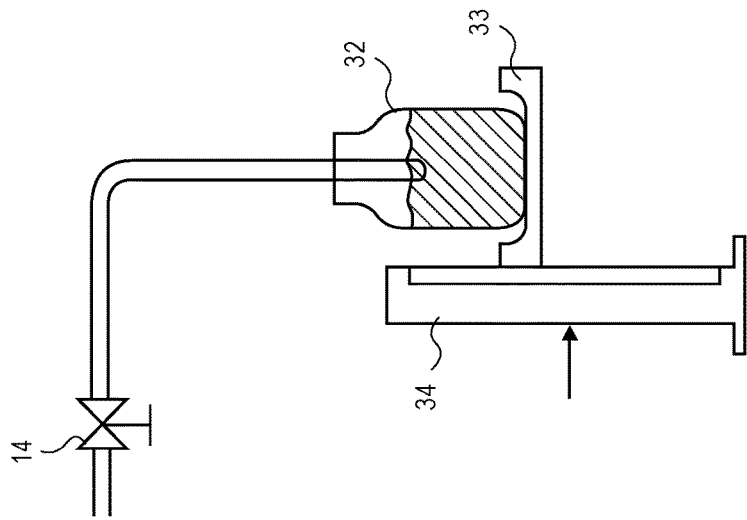
FIGS. 3a and 3b illustrate different conditions during the filling of a cartridge.
Figure 3A:
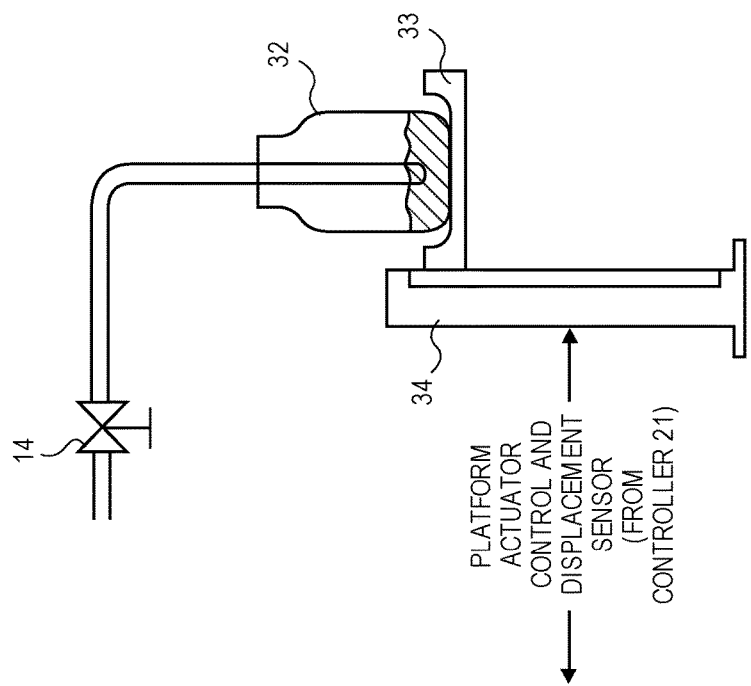

The controller 21 may also be used to control an automatic cartridge filling process, in which a cartridge is automatically filled during a cartridge fill cycle. Turning now to FIGS. 3a, 3b, these illustrate different conditions during the cartridge fill cycle. The system in the example shown here includes a platform 33 on which a cartridge 32 is placed so as to be filled with the mixture (that is coming out of a vertically oriented nozzle that is coupled to the outlet of the valve 14). The platform 32 is positioned directly below the nozzle, so that when the platform 32 is raised to the "begin filling" position depicted in FIG. 3a, the nozzle extends straight down through the open mouth of the cartridge 32 and into the cavity therein, such that the open end of the nozzle is positioned just above the inside bottom of the cartridge 32 as shown. When the platform is then lowered to its "stop filling" position as shown in FIG. 3b, the open end of the nozzle is positioned closer to the open mouth of the cartridge 32. The nozzle remains vertically oriented through both raising and filling phases, and as such does not touch the cartridge 32 which may remain upright the entire time it is resting on or being held by the platform 32.

The platform 33 is coupled to a platform actuator 34 which may be a linear actuator (e.g., pneumatic, electro-mechanical) whose speed and position are electrically controllable by the controller 21. The cartridge filling process may begin with the system initialized such that the platform 33 is in a bottom most position (e.g., lower than in FIG. 3b), and the user then places an empty cartridge 32 on the platform 33, and then presses the Start button in the status and control panel 22 (see FIG. 1). The controller 21 then signals the actuator 34 to raise the platform 33 to its begin filling position depicted in FIG. 3a. Pressing the Start button also causes the internal dispense signal to be asserted, in response to which the controller 21 performs the process described below in connection with FIG. 4 to cause the mixture to be dispensed from the outlet of the mixing chamber 13. Based on the previously programmed knowledge of the flow rate of the mixture and the volume of the cartridge cavity to be filled, a count down timer is set. In response to expiration of the timer, the controller 21 responds by deactivating the pumps 16, 17 and signaling the filling actuator 24 to stop.

While filling, the controller 21 may signal the platform actuator 34 to lower the platform 33 in accordance with the timer counting down, so that the open end of the nozzle may always remain in contact with the rising top portion of the mixture inside the cartridge 32, in order to reduce the likelihood of creating air voids in the collected mixture (just below the nozzle). Also, to help break the bead of mixture that can be formed at the open end of the nozzle, once the pumps 16, 17 are deactivated and the filling actuator stops moving (when the timer expires), the controller 21 signals the platform actuator 34 to slowly drop (further than the top filling position shown in FIG. 3b), so as to break the bead at the open end of the cartridge filling nozzle. At that point, the filled cartridge 32 may be removed from the platform 33, and the fill cycle described above can repeat to fill a new, empty cartridge 32.

Figure 4:
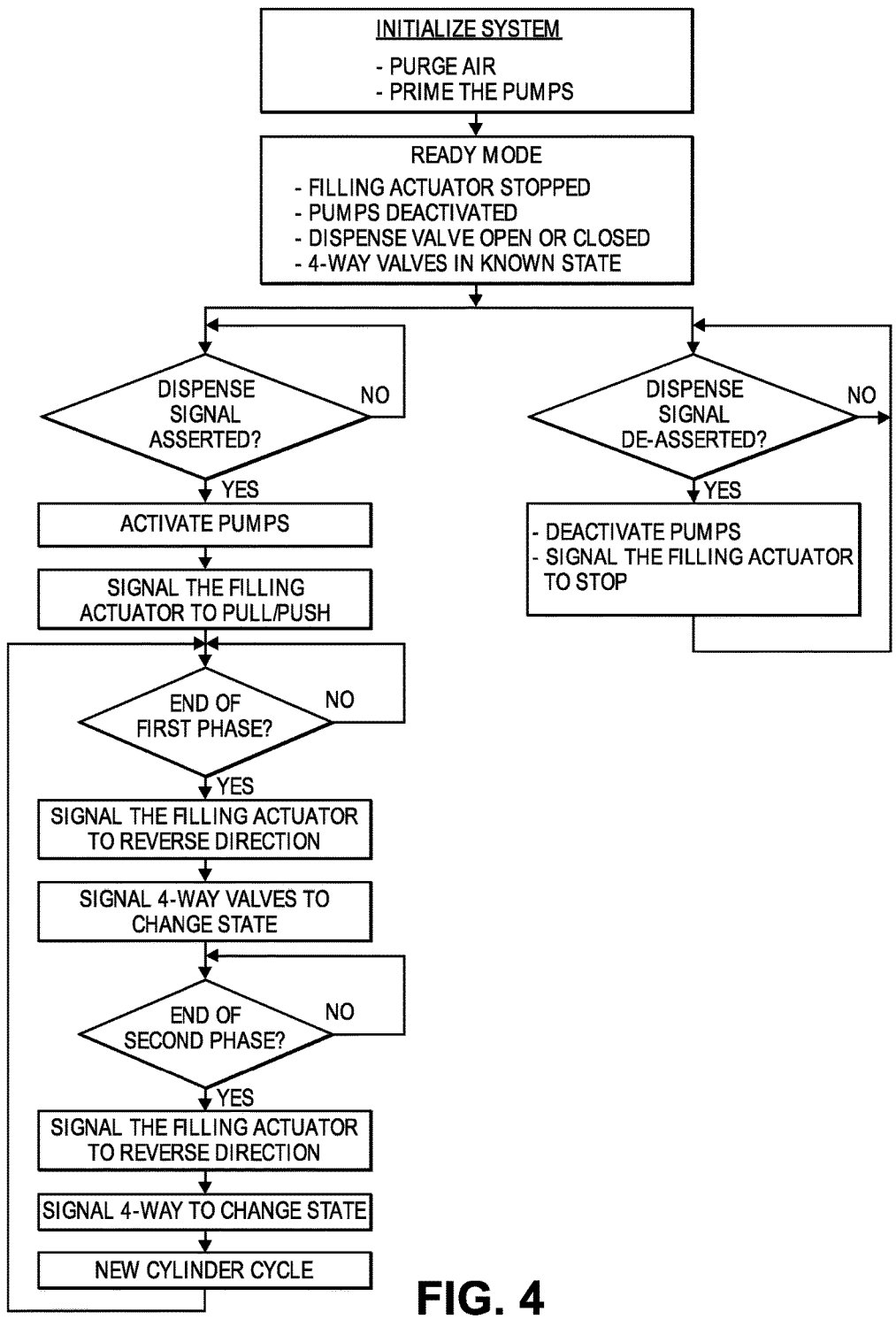
FIG. 4 is a flow diagram of operations performed by an electronic controller of the system of FIG. 1.

Turning now to FIG. 4, a flow diagram of operations that may be performed by an electronic controller of a two component metering, mixing, and dispensing system, such as the system of FIG. 1, is shown. Although the operations are described sequentially, it is possible that one or more of the operations may be performed out of sequence or simultaneously with others. Also, the operations described below could also be applicable to hardware that is different than the particular example of the system depicted in FIG. 1. The process begins with initialization of the system, which may include powering up the actuators of the 4-way valves 11, 12, the filling actuator 24, the pumps 16, 17 and the controller 21, and then purging the plumbing of air, and priming the pumps 16, 17. The controller 21 then enters its ready mode in which the filling actuator 24 is stopped, the pumps 16, 17 are inactive, and the 4-way valves 11, 12 are in a known state (e.g., ports 1-2 connected, and ports 3-4 connected, as shown in FIG. 1). If the dispensing valve 14 is provided, it may be placed either in its closed or open state, but preferably in its closed state to ensure accurate mixture delivery by preventing any mixture flow out of the chamber 13. At this point, the dispense signal should be reset into its de-asserted state, and the controller 21 will now wait in its ready mode until the dispense signal is asserted.

As pointed out above, the dispense signal may be asserted in response to for example the Start button being pressed or a dispensing gun trigger being squeezed. In response, the controller 21 signals the valve 14 to become open, activates the pumps 16, 17 and signals the filling actuator 24 to pull or push (depending on the current state of the 4-way valves 11, 12). As an example, assume the state depicted in FIG. 1—in that case, the actuator 24 starts pulling the cylinder. This may be viewed as the first phase of a cylinder cycle, in which the pumps are active and the back volumes 25, 26 of the cylinders 15, 10 are being filled with catalyst and base materials, respectively (from their respective containers, as shown). Also, because the actuator 24 is pulling the pistons 19, 18, in the plumbing configuration of FIG. 1 this means that catalyst and base materials are being pushed out of the front volumes 27, 28 (and into the mixing chamber 13). Mixture is now flowing out of the valve 14.

The controller 21 may then detect the end of the first phase, by for example recognizing the output of the displacement sensor in the actuator 24 that the cylinder rod has reached a predetermined position. It then signals the filling actuator 24 to reverse direction, and also signals both of the 4-way valves to change state, while the pumps 16, 17 remain active and the valve 14 remains open. This marks the start of the second phase of the cylinder cycle, in which the pumps are active and the back volumes 25, 26 of the cylinders 15, 10 are being emptied (assuming the arbitrary definition for the first phase given above) by virtue of the actuator 24 now pushing the cylinder rod, such that mixture continues to flow out of the mixing/dispense valve 14. The front volumes 27, 28 are now being filled with catalyst and base materials, respectively, from their respective containers.

The controller 21 may then detect the end of the second phase, by for example recognizing from the output of the displacement sensor in the actuator 24 that the cylinder rod has reached another predetermined position. It then signals the filling actuator 24 to reverse direction and the 4-way valves 11, 12 to change state, while the pumps 16, 17 remain active and the mixing/dispense valve 14 remains open. This marks the start of a new cylinder cycle, and the beginning of the first phase in that new cycle, in which the pumps are active and the back volumes 25, 26 are again being filled while the front volumes 27, 28 are being emptied (so that mixture continues to flow out of the valve 14).

The above process operations repeat as indicated in the flow diagram, so long as the dispense signal remains asserted, which results in the mixture being dispensed from the outlet of the mixing chamber 13. Once the dispense signal becomes de-asserted however, the process may immediately deactivate the pumps 16, 17 and signals the filling actuator 24 to stop (pulling or pushing). This causes the back pressures (on the base and fluid materials), as well as the outlet pressures of the pumps 16, 17 to drop, while the controller 21 remains in its ready mode. Also, the controller 21 signals the valve 14 (if provided) to become closed, for example to help maintain accuracy in the amount of mixture that was dispensed. In the ready mode, the actuators may all remain powered up, but they are not active, and as such the back pressures of the base and catalyst materials continue to drop. This period of dropping pressure between successive assertions of the dispense signal (e.g., successive cartridge fill cycles) enables the average pressure on the base and catalyst materials to remain lower than if the pumps 16, 17 were to remain active and the mixing/dispense valve 14 were present and was placed in its closed position (in between cartridge fill cycles). Lower pressures on the base material may help improve the consistency of the resulting mixture over many cartridge fill or other dispensing cycles.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the definition of the first phase of the cylinder cycle is arbitrary, as are the references to the "front" and "back" volumes. Those adjectives are only used to make it easier to understand how the metering devices function. The description is thus to be regarded as illustrative instead of limiting.

What is claimed is:

1. A two-component fluid metering, mixing and dispensing system, comprising:
   a base 4-way valve having a first port, a second port, a third port and a fourth port;
   a base pump that is to draw and supply a base fluid to the first port of the base 4-way valve;
   a catalyst 4-way valve having a first port, a second port, a third port and a fourth port;
   a catalyst pump that is to draw and supply a catalyst fluid to the first port of the catalyst 4-way valve;
   a mixing chamber having a base inlet and a catalyst inlet coupled to the fourth ports of the base valve and the catalyst valve, respectively, and a mixture dispensing outlet;
   a base cylinder, being a double acting piston cylinder, having a base rod, a first port that is coupled to the second port of the base 4-way valve, and a second port that is coupled to the third port of the base 4-way valve;
   a catalyst cylinder, being a double acting piston cylinder, having a catalyst rod, a first port that is coupled to the second port of the catalyst 4-way valve, and a second port that is coupled to the third port of the catalyst 4-way valve;
   an actuator that is coupled to push or pull the base and catalysts rods so as to push the base and catalyst fluids out of the base and catalyst cylinders, respectively; and
   an electronic controller that, while in ready mode, a) electrically activates the base and catalyst pumps and b) signals the actuator to push or pull the rods, in response to a dispense signal being asserted, so that fluid pressures rise to dispensing levels while the base and catalyst fluids are flowing out of the fourth ports, and
   wherein the controller then a) electrically deactivates the base and catalyst pumps, b) signals the actuator to stop pushing or stop pulling the rods, and c) remains in the ready mode, in response to the dispense signal being de-asserted, so that the controller remains in the ready mode while the fluid pressures drop.

2. The system of claim 1 wherein the controller, while still in the ready mode and with the dispense signal being de-asserted and the fluid pressures dropping, responds to a subsequent assertion of the dispense signal by a) electrically activating the base and catalyst pumps again and b) signaling the actuator to push or pull the rods, which raises the fluid pressures to dispensing levels.

3. The system of claim 1 wherein the base and catalyst pumps are rotary positive displacement pumps, the controller to electronically adjust pressure or flow rate at the mixture dispensing outlet, by adjusting speeds of the rotary displacement pumps.

4. The system of claim 1 wherein the controller is to electronically adjust pressure or flow rate at the mixture dispensing outlet, by signaling the actuator to adjust speed at which the base and catalysts rods are pushed and pulled by the actuator.

5. The system of claim 1 wherein the dispense signal is a) asserted in response to a dispensing gun trigger being squeezed by a user or by a robot, and b) de-asserted in response to the dispensing gun trigger being released.

6. The system of claim 1 wherein the dispense signal is a) asserted in response to a foot pedal switch being pressed to fill a cartridge from the mixture dispensing outlet, and b) de-asserted in response to the foot pedal switch being released when the cartridge has been filled to a desired level.

7. The system of claim 1 wherein the base cylinder has a piston that separates an interior volume of the base cylinder into a back volume that is open to the first port, and a front volume that is open to the second port,
   wherein during a first phase of a cylinder cycle the back volume increases and is filled with the base fluid while the front volume decreases and is emptied of the base fluid, and wherein during a second phase of the cylinder cycle the back volume decreases and is emptied of the base fluid while the front volume increases and is filled with the base fluid.

8. The system of claim 7 wherein the catalyst cylinder has a piston that separates an interior volume of the catalyst cylinder into a back volume that is open to the first port, and a front volume that is open to the second port,
wherein during the first phase of the cylinder cycle the back volume increases and is filled with the catalyst fluid while the front volume decreases and is emptied of the catalyst fluid, and
wherein during the second phase of the cylinder cycle the back volume decreases and is emptied of the catalyst fluid while the front volume increases and is filled with the catalyst fluid.

9. The system of claim 8 wherein the base cylinder comprises a base rod attached to the piston, and the catalyst cylinder comprises a catalyst rod attached to the piston, the system further comprising a coupler that joins the base rod to the catalyst rod so that the base and catalyst rods move as one cylinder rod, back and forth during the cylinder cycle.

10. The system of claim 9 wherein the base 4-way valve comprises a base valve actuator, and the catalyst 4-way valve comprises a catalyst valve actuator, the system further comprising a displacement sensor coupled to provide the electronic controller with sensed data that the controller uses to derive a position of the cylinder rod, and
wherein at the end of the first phase of the cylinder cycle or in response to the cylinder rod reaching a first position, controller is to
i) signal the base valve actuator to transition the base valve from a) first and second ports connected to each other, and third and fourth ports connected to each other, to b) first and third ports connected to each other, and second and fourth ports connected to each other, and
ii) signal the catalyst valve actuator to transition the catalyst valve from a) first and second ports connected to each other, and third and fourth ports connected to each other, to b) first and third ports connected to each other, and second and fourth ports connected to each other.

11. The system of claim 10 wherein the controller, in response to the cylinder rod reaching the first position, reverses direction of the actuator from pushing to pulling, or from pulling to pushing.

12. The system of claim 10 wherein at the end of the second phase of the cylinder cycle or in response to the cylinder rod reaching a second position the controller is to
i) signal the base valve actuator to transition the base valve from a) first and third ports connected to each other, and second and fourth ports connected to each other, to b) first and second ports connected to each other, and third and fourth ports connected to each other, and
ii) signal the catalyst valve actuator to transition the catalyst valve from a) first and third ports connected to each other, and second and fourth ports connected to each other, to b) first and second ports connected to each other, and third and fourth ports connected to each other,
and wherein the cylinder cycle repeats so long as the base pump and catalyst pump are active simultaneously such that the base and catalyst fluids continuously flow out of the fourth ports of the base valve and the catalyst valves, respectively, in metered amounts.

13. The system of claim 12 wherein the controller, in response to the cylinder rod reaching the second position, reverses direction of the actuator from pushing to pulling, or from pulling to pushing.

14. The system of claim 1 further comprising:
a first over-limit switch that is set off by the cylinder rod; and
a second over-limit switch that is set off by the cylinder rod, wherein the first and second switches are coupled to assert an emergency stop signal.

15. A two-component fluid metering, mixing and dispensing system, comprising:
a first 4-way valve having a first port, a second port, a third port and a fourth port;
a first pump that is to draw and supply a first fluid to the first port of the base 4-way valve;
a second 4-way valve having a first port, a second port, a third port and a fourth port;
a second pump that is to draw and supply a second fluid to the first port of the second 4-way valve;
a mixing chamber having a first inlet and a second inlet connected to the fourth ports of the first valve and the second valve, respectively, and a mixture dispensing outlet;
a first cylinder, being a double acting piston cylinder, having a first rod, a first port that is connected to the second port of the first 4-way valve, and a second port that is connected to the third port of the first 4-way valve;
a second cylinder, being a double acting piston cylinder, having a second rod, a first port that is connected to the second port of the second 4-way valve, and a second port that is connected to the third port of the second 4-way valve;
an actuator that is coupled to push or pull the first and second rods so as to push first and second fluids out of the first and second cylinders, respectively; and
an electronic controller that, while in ready mode, a) electrically activates the first and second pumps and b) signals the actuator to push or pull the rods, in response to a dispense signal being asserted, so that fluid pressures rise to dispensing levels while the first and second fluids are flowing out of the fourth ports, and
wherein the controller then a) electrically deactivates the first and second pumps, b) signals the actuator to stop pushing or stop pulling the rods, and c) remains in the ready mode, in response to the dispense signal being de-asserted, so that the controller remains in the ready mode while the fluid pressures drop.

16. The system of claim 15 wherein the controller, while still in the ready mode and with the dispense signal being de-asserted and the fluid pressures dropping, responds to a subsequent assertion of the dispense signal by a) electrically activating the first and second pumps again and b) signaling the actuator to push or pull the rods, which raises the fluid pressures to dispensing levels.

17. The system of claim 15 wherein the first and second pumps are rotary positive displacement pumps, the controller to electronically adjust pressure or flow rate at the mixture dispensing outlet, by adjusting speeds of the rotary displacement pumps.

18. The system of claim 15 wherein the controller is to electronically adjust pressure or flow rate at the mixture dispensing outlet, by signaling the actuator to adjust speed at which the first and second rods are pushed and pulled by the actuator.

19. A two-component fluid metering, mixing and dispensing system, comprising:
- a base valve having a first port, a second port, a third port and a fourth port;
- a base pump that is to supply a base fluid to the first port of the base valve;
- a catalyst valve having a first port, a second port, a third port and a fourth port;
- a catalyst pump that is to supply a catalyst fluid to the first port of the catalyst valve;
- a mixing chamber having a base inlet and a catalyst inlet connected to the fourth ports of the base valve and the catalyst valve, respectively, and a mixture dispensing outlet;
- a base cylinder having a first port that is connected to the second port of the base valve, and a second port that is connected to the third port of the base valve;
- a catalyst cylinder having a first port that is connected to the second port of the catalyst valve, and a second port that is connected to the third port of the catalyst valve;
- an actuator that is coupled to actuate the base and catalyst cylinders so as to push the base and catalyst fluids out of the base and catalyst cylinders, respectively; and
- an electronic controller having a ready mode and a dispensing mode,
  - wherein in the dispensing mode the controller i) electrically activates the base and catalyst pumps and ii) signals the actuator to push or pull, in response to a dispense signal being asserted, and
  - wherein in the ready mode the controller a) electrically deactivates the base and catalyst pumps, b) signals the actuator to stop pushing or stop pulling, and maintains a) and b) in response to the dispense signal being de-asserted.

20. The system of claim 19 wherein the controller is to electrically control a) speed of the base pump, and b) speed or force of pushing and pulling by the actuator, so as to maintain pressure of the base fluid within a dispensing range.

* * * * *